(12) United States Patent
Watanabe et al.

(10) Patent No.: US 8,723,436 B2
(45) Date of Patent: May 13, 2014

(54) LED LIGHTING DEVICE AND ILLUMINATION APPARATUS INCLUDING SAME

(75) Inventors: Koji Watanabe, Yawata (JP); Hiromitsu Mizukawa, Suita (JP); Kenji Matsuda, Hirakata (JP)

(73) Assignee: Panasonic Corporation, Osaka (JP)

( * ) Notice: Subject to any disclaimer, the term of this patent is extended or adjusted under 35 U.S.C. 154(b) by 85 days.

(21) Appl. No.: 13/398,078

(22) Filed: Feb. 16, 2012

(65) Prior Publication Data
US 2012/0212148 A1 Aug. 23, 2012

(30) Foreign Application Priority Data

Feb. 22, 2011 (JP) .................................. 2011-035791

(51) Int. Cl.
*H05B 37/02* (2006.01)
(52) U.S. Cl.
USPC ............................ 315/224; 315/274; 315/291
(58) Field of Classification Search
USPC ............. 315/209 R, 224, 225, 226, 246, 274, 315/276, 291, 294, 297
See application file for complete search history.

(56) References Cited

U.S. PATENT DOCUMENTS

| | | | | |
|---|---|---|---|---|
| 4,864,482 A | * | 9/1989 | Quazi et al. | 363/37 |
| 5,638,264 A | | 6/1997 | Hayashi et al. | |
| 6,011,357 A | * | 1/2000 | Gradzki et al. | 315/224 |
| 2004/0207337 A1 | * | 10/2004 | Fischer et al. | 315/224 |
| 2008/0316781 A1 | * | 12/2008 | Liu | 363/80 |
| 2011/0025217 A1 | | 2/2011 | Zhan et al. | |
| 2011/0309759 A1 | * | 12/2011 | Shteynberg et al. | 315/201 |

FOREIGN PATENT DOCUMENTS

JP S60-51415 3/1985
JP H5-257548 10/1993

OTHER PUBLICATIONS

Chinese Office Action dated Dec. 19, 2013 and English translation thereof.

* cited by examiner

*Primary Examiner* — Tung X Le
(74) *Attorney, Agent, or Firm* — Bacon & Thomas, PLLC (57) ABSTRACT

An LED lighting device includes two or more switching circuits connected between a power source and an LED (light emitting diode) unit, an inrush current limiting circuit which limits an inrush current flowing through the LED lighting device when power is turned on and a trigger circuit which generates a trigger signal of an operation/non-operation of the inrush current limiting circuit from the switching circuits. Further, the inrush current limiting circuit is set in a non-operation state when any one of the switching circuits is started first.

4 Claims, 6 Drawing Sheets

LED LIGHTING DEVICE AND ILLUMINATION APPARATUS INCLUDING SAME

FIELD OF THE INVENTION

The present invention relates to an LED (light emitting diode) lighting device and an illumination apparatus including same.

BACKGROUND OF THE INVENTION

In general, an LED lighting device includes an inrush current limiting circuit to limit an inrush current flowing through a capacitor for smoothing a power source voltage or an output voltage of a switching circuit when a power is turned on. Further, in the LED lighting device, the inrush current limiting circuit is set to an operation state suppressing the current flowing therethrough at an initial stage of turning on the LED lighting device, and then set to a non-operation state not suppressing the current flowing therethrough when a predetermined switching circuit of the LED lighting device is operated.

In case where the LED lighting device includes a plurality of switching circuits, the predetermined switching circuit may not be started first. In this case, the inrush current limiting circuit is maintained in the operation state until the predetermined switching circuit is operated, and thus an input current to the LED lighting device is limited.

Accordingly, the LED lighting device may supply a current enough to operate the switching circuits thereof, and thus the switching circuits may not perform desired operations. The desired operations are, e.g., supplying a desired output power from the switching circuit and the like.

Figure 6:
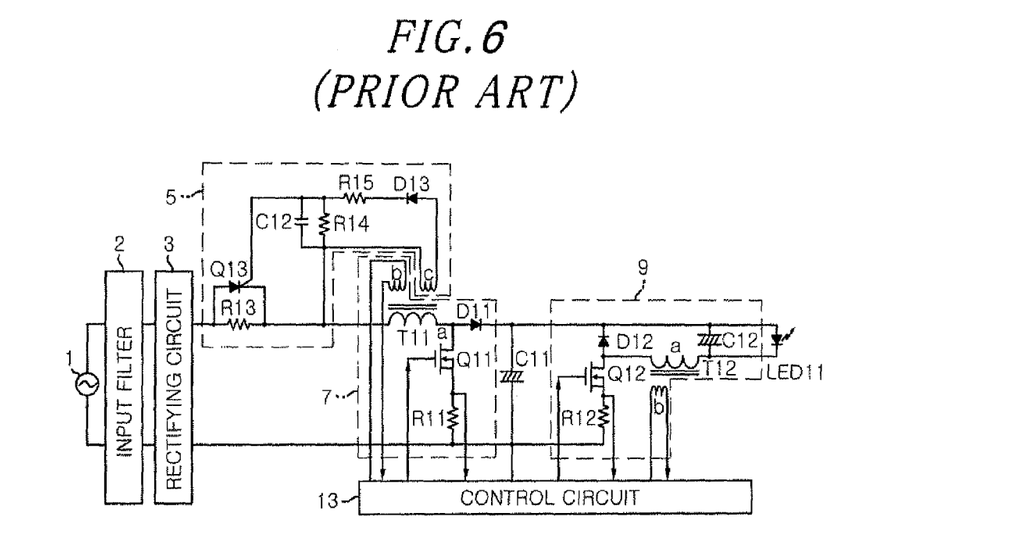
FIG. 6 illustrates a circuit configuration of a conventional LED lighting device.

FIG. 6 illustrates a circuit configuration of a conventional LED lighting device including an input filter 2 connected to a power source 1, a rectifying circuit 3, switching circuits of a step-up chopper circuit 7 and a step-down chopper circuit 9, an inrush current limiting circuit 5, and a control circuit 13.

The power source 1 is an AC power source. The step-up chopper circuit 7 includes a MOS-FET Q11, a primary winding (represented by a) of a transformer T11, a first (input side b) secondary winding of the transformer T11, a diode D11, and a resistor R11. The transformer T11 is formed of coils.

The step-down chopper circuit 9 includes a MOS-FET Q12, a primary winding (represented by a) of a transformer T12, a first (input side b) secondary winding of the transformer T12, a diode D12, a resistor R12, and a capacitor C12. The transformer T12 is formed of coils.

The inrush current limiting circuit 5 includes a resistor R13 serving as an inrush current limiter, a switching element Q13, a capacitor C12, resistors R14 and R15, diodes D13, and a second (output side c) secondary winding of the transformer T11. (see Japanese Patent Application Publication Nos. H5-257548 and S60-51415)

In the LED lighting device shown in FIG. 6, a trigger signal of the operation/non-operation of an inrush current limiting circuit 5 is supplied from the step-up chopper circuit 7. In this case, if the step-down chopper circuit 9 is started first after a power source 1 is turned on, the input current flows through a resistor R13 of the inrush current limiting circuit 5 until the step-up chopper circuit 7 is operated.

Accordingly, the LED lighting device shown in FIG. 6 may not accumulate a sufficient amount of electric charges in a smoothing capacitor C11 located at the output of the step-up chopper circuit 7 by consumption of the input current due to the step-down chopper circuit 9 and a voltage generated across the resistor R13.

That is, in the LED lighting device shown in FIG. 6, the output of the step-up chopper circuit 7 may not have a desire voltage.

SUMMARY OF THE INVENTION

In view of the above, the present invention provides an LED lighting device capable of surely performing a desired operation by setting an inrush current limiting circuit in a non-operation state in response to a switching circuit which starts operation first, and an illumination apparatus including same.

In accordance with an embodiment of the present invention, there is provided an LED lighting device including: two or more switching circuits connected between a power source and an LED (light emitting diode) unit; an inrush current limiting circuit which limits an inrush current flowing through the LED lighting device when power is turned on; and a trigger circuit which generates a trigger signal of an operation/non-operation of the inrush current limiting circuit from the switching circuits. Further, the inrush current limiting circuit is set in a non-operation state when any one of the switching circuits is started first.

Further, the trigger circuit may use a voltage of a secondary winding of coils of each of the switching circuits.

In accordance with another embodiment of the present invention, there is an illumination apparatus including: the LED lighting device described above.

In the LED lighting device and the illumination apparatus including the LED lighting device in accordance with the present invention, there is an effect of surely performing a desired operation by setting an inrush current limiting circuit in a non-operation state in response to a switching circuit which starts operation first.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described with reference to the accompanying drawings, which form a part hereof.

(First Embodiment)

In an illumination device in accordance with a first embodiment of the present invention, a trigger signal of an inrush current limiting circuit is generated from each of at least two switching circuits, and the inrush current limiting circuit is put into a non-operation state suppressing an incoming current therethrough at a timing of generating a trigger signal by a switching circuit which is started first. Accordingly, in the illumination device of this embodiment, the inrush current limiting circuit is set in the non-operation state immediately after a power source is turned on and one of the switching circuits is started, so that an input current flows sufficiently. Thus, in the illumination device of this embodiment, it is possible to surely perform a desired operation. The desired operation is, e.g., supplying a desired output power from a switching circuit.

Figure 1:
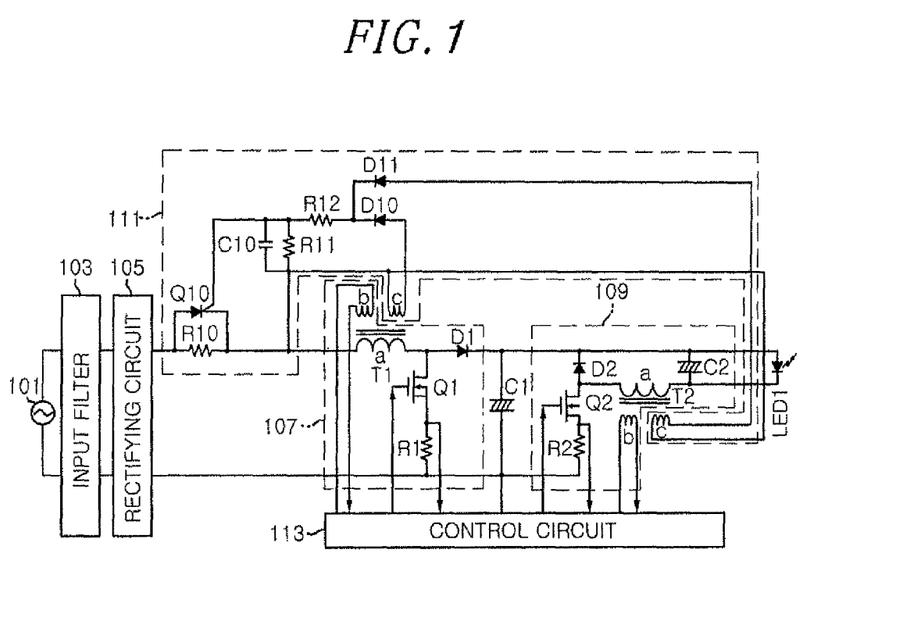
FIG. 1 illustrates a circuit configuration of an illumination device in accordance with a first embodiment of the present invention.

The illumination device of this embodiment serves as an LED lighting device turning on and off an LED 1, and a configuration thereof is shown in FIG. 1, for example. A circuit configuration of the illumination device shown in FIG. 1 includes an input filter 103 connected to a power source 101, a rectifying circuit 105, a step-up chopper circuit 107, a step-down chopper circuit 109, a smoothing capacitor C1, an inrush current limiting circuit 111, and a control circuit 113.

The power source 101 is an AC power source.

The step-up chopper circuit 107 includes a MOS-FET Q1, a primary winding a of a transformer T1, a first secondary winding (input side) b of the transformer T1, a diode D1, and a resistor R1. The transformer T1 is formed of coils.

The step-down chopper circuit 109 includes a MOS-FET Q2, a primary winding a of a transformer T2, a first secondary winding (input side) b of the transformer T2, a diode D2, a resistor R2, and a capacitor C2. The transformer T2 is formed of coils.

The inrush current limiting circuit 111 includes a resistor R10 serving as an inrush current limiter, a switching element Q10, a capacitor C10, resistors R11 and R12, diodes D10 and D11, a second secondary winding (output side) c of the transformer T1, and a second secondary winding (output side) c of the transformer T2.

(Operation of Step-Up Chopper Circuit 107)

Next, the operation of the step-up chopper circuit 107 will be described. A detection signal for turning on the MOS-FET Q1 is generated by a signal of the first secondary winding b of the transformer T1.

Further, a current flowing during the ON period of the MOS-FET Q1 is detected by the resistor R1, thereby generating a detection signal for turning off the MOS-FET Q1.

The control circuit 113 compares each detection signal with a reference voltage to determine a timing of turning on and off the MOS-FET Q1.

The control circuit 113 generates a signal for turning on and off the MOS-FET Q1 based on the determined on/off timing, and controls an output voltage of the step-up chopper circuit 107 to become a specific voltage.

(Operation of Step-Down Chopper Circuit 109)

Next, the operation of the step-down chopper circuit 109 will be described. A detection signal for turning on the MOS-FET Q2 is generated by a signal of the first secondary winding b of the transformer T2.

Further, a current flowing during the ON period of the MOS-FET Q2 is detected by the resistor R2, thereby generating a detection signal for turning off the MOS-FET Q2.

The control circuit 113 compares each detection signal with a reference voltage to determine a timing of turning on and off the MOS-FET Q2.

The control circuit 113 generates a signal for turning on and off the MOS-FET Q2 based on the determined ON/OFF timing, and controls such that a current flowing through the LEN becomes a specific current.

(Operation of Inrush Current Limiting Circuit 111)

The inrush current limiting circuit 111 is configured as follows. Further, in this embodiment, the resistor R10 serving as an inrush current limiter is provided to reduce an inrush current. Instead of the resistor R10, a thermistor may be used as the inrush current limiter.

After one of the step-up chopper circuit 107 and the step-down chopper circuit 109 is started, the inrush current limiting circuit 111 is set in a non-operation state. That is, in this embodiment, an input current flowing from the power source 101 passes through the switching element Q10 without passing through the inrush current limiter R10 when any one of the step-up chopper circuit 107 and the step-down chopper circuit 109 is started first, thereby becoming an almost short-circuited (conducting) state.

In this embodiment, a thyristor is used as the switching element Q10. However, a relay, transistor, MOS-FST or the like may be used as the switching element Q10.

In FIG. 1, a start-up voltage for turning on the thyristor serving as the switching element Q10 is obtained from the second secondary winding c of the transformer T1 in the step-up chopper circuit 107 and the second secondary winding c of the transformer T2 in the step-down chopper circuit 109.

The second secondary winding c of the transformer T1 of the step-up chopper circuit 107 and the second secondary winding c of the transformer T2 in the step-down chopper circuit 109 function as a trigger circuit. Further, a trigger signal for the operation/non-operation of the inrush current limiting circuit 111 is generated from the trigger circuit.

In this embodiment, an OR circuit is configured by diodes D10 and D11 and resistors R11 and R12 such that any one of switching circuit of the step-up chopper circuit 107 and the step-down chopper circuit 109 can be started first to turn on the switching element Q10.

The output voltage of the OR circuit is smoothed by the capacitor Q10 to become a start-up voltage for turning on the switching element Q10 (thyristor).

Accordingly, in the illumination device of this embodiment, after the power source is turned on, the inrush current can be reduced by the resistor R10 serving as the inrush current limiter. Further, in the illumination device of this embodiment, no matter which one of the step-up chopper circuit 107 and the step-down chopper circuit 109 is started first after the inrush current is reduced, it is possible to ensure the start-up voltage of the switching element Q10.

Therefore, in the illumination device of this embodiment, after the power source is turned on, the switching element Q10 is turned on immediately, so that each switching circuit (step-up chopper circuit 107, step-down chopper circuit 109) can surely perform a desired operation.

(First Example of Another Configuration)

Figure 2:
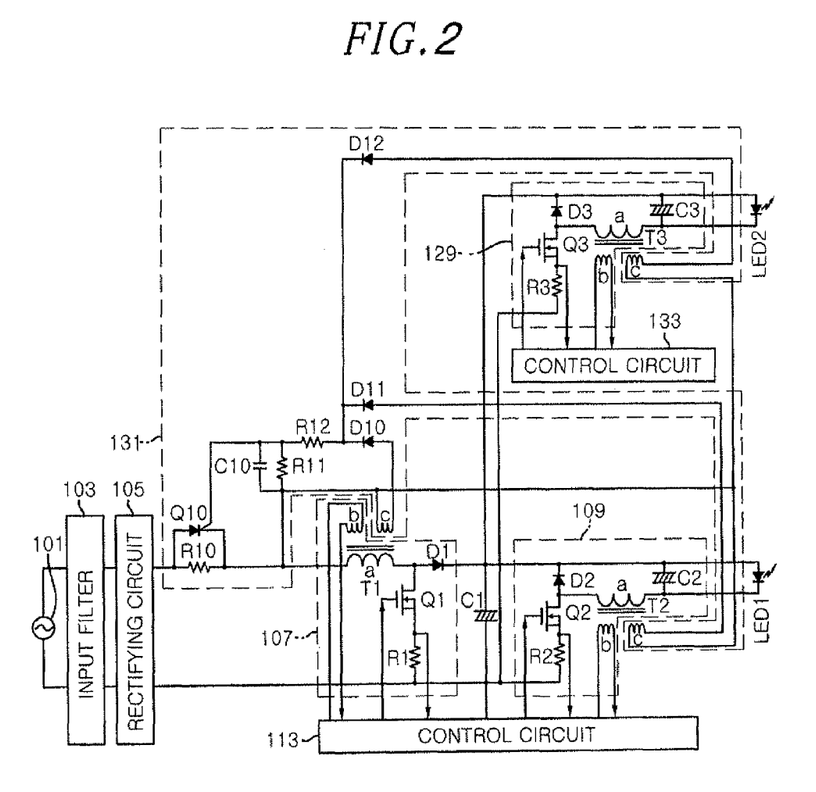
FIG. 2 illustrates a first example of another circuit configuration in connection with the first embodiment.

FIG. 2 illustrates a first example of another configuration of the illumination device in accordance with the first embodiment of the present invention. The circuit configuration of the first example shown in FIG. 2 is different from the circuit configuration shown in FIG. 1 in that a lighting circuit of an LED2 is added and a configuration of the inrush current limiting circuit is changed according to the addition of the lighting circuit of the LED2.

In the circuit configuration shown in FIG. 2, the like reference numerals will be given to like parts as those in the circuit configuration of the illumination apparatus shown in FIG. 1, and redundant description thereof will be omitted.

In the configuration shown in FIG. 2, a step-down chopper circuit 129 and a control circuit 133 are further provided to form the lighting circuit of the LED2 in addition to the configuration of FIG. 1.

(Step-Down Chopper Circuit 129)

The step-down chopper circuit 129 includes a MOS-FET Q3, a primary winding a of a transformer T3, a first secondary winding (input side) b of the transformer T3, a diode Q3, a resistor R3, and a capacitor C3.

Next, the operation of the step-down chopper circuit 129 will be described. A detection signal for turning on the MOS-FET Q3 is generated by a signal of the first secondary winding b of the transformer T3.

Further, a current flowing during the ON period of the MOS-FET Q3 is detected by the resistor R3, thereby generating a detection signal for turning off the MOS-FET Q3.

The control circuit 133 compares each detection signal with a reference voltage to determine a timing of turning on and off the MOS-FET Q3.

The control circuit 133 generates a signal for turning on and off the MOS-FET Q3 based on the determined on/off timing, and controls a current flowing through the LED2 to become a specific current.

(Configuration of Inrush Current Limiting Circuit 131)

An inrush current limiting circuit 131 is configured as follows. Further, also in this configuration, the resistor R10 serving as the inrush current limiter is provided to reduce an inrush current. Instead of the resistor R10, a thermistor may be used as the inrush current limiter.

The inrush current limiting circuit 131 shown in FIG. 2 includes the resistor R10, the switching element Q10, the capacitor C10, the resistors R11 and R12, the diodes D10 and D11, and the second secondary winding (output side) c of each of the transformers T1, T2 and T3.

After one of the step-up chopper circuit 107, the step-down chopper circuit 109, and the step-down chopper circuit 129 is started, the inrush current limiting circuit 131 is set in a non-operation state. That is, an input current flowing from the power source 101 passes through the switching element Q10 without passing through the inrush current limiter R10 when any one of the step-up chopper circuit 107, the step-down chopper circuit 109, and the step-down chopper circuit 129 is started first, thereby becoming an almost short-circuited (conducting) state.

In FIG. 2, a start-up voltage for turning on the thyristor serving as the switching element Q10 is obtained from the second secondary winding c of the transformer T1 in the step-up chopper circuit 107, the second secondary winding c of the transformer T2 in the step-down chopper circuit 109 and the second secondary winding c of the transformer T3 in the step-down chopper circuit 129.

The second secondary winding c of the transformer in each of the step-up chopper circuit 107, the step-down chopper circuit 109 and the step-down chopper circuit 129 functions as a trigger circuit. Further, a trigger signal for the operation and non-operation of the inrush current limiting circuit 131 is generated from the trigger circuit.

In this configuration shown in FIG. 2, an OR circuit is configured by diodes D10, D11 and D12 and resistors R11 and R12 such that any one of switching circuit of the step-up chopper circuit 107 and the step-down chopper circuits 109 and 129 may be started first to turn on the switching element Q10.

The output voltage of the OR circuit is smoothed by the capacitor Q10 to become a start-up voltage for turning on the switching element Q10 (thyristor).

Accordingly, in the illumination device having the configuration shown in FIG. 2 as well, after the power source is turned on, the inrush current can be reduced by the resistor R10 serving as the inrush current limiter. Further, in the illumination device of this example, no matter which one of the step-up chopper circuit 107, the step-down chopper circuit 109 and the step-down chopper circuit 129 is started first after the inrush current is reduced, it is possible to ensure the start-up voltage of the switching element Q10.

Therefore, in the illumination device having the configuration shown in FIG. 2, after the power source is turned on, the switching element Q10 is turned on immediately, so that each switching circuit (step-up chopper circuit 107, step-down chopper circuit 109, step-down chopper circuit 129) can surely perform a desired operation.

(Second Example of Another Configuration)

Figure 3:
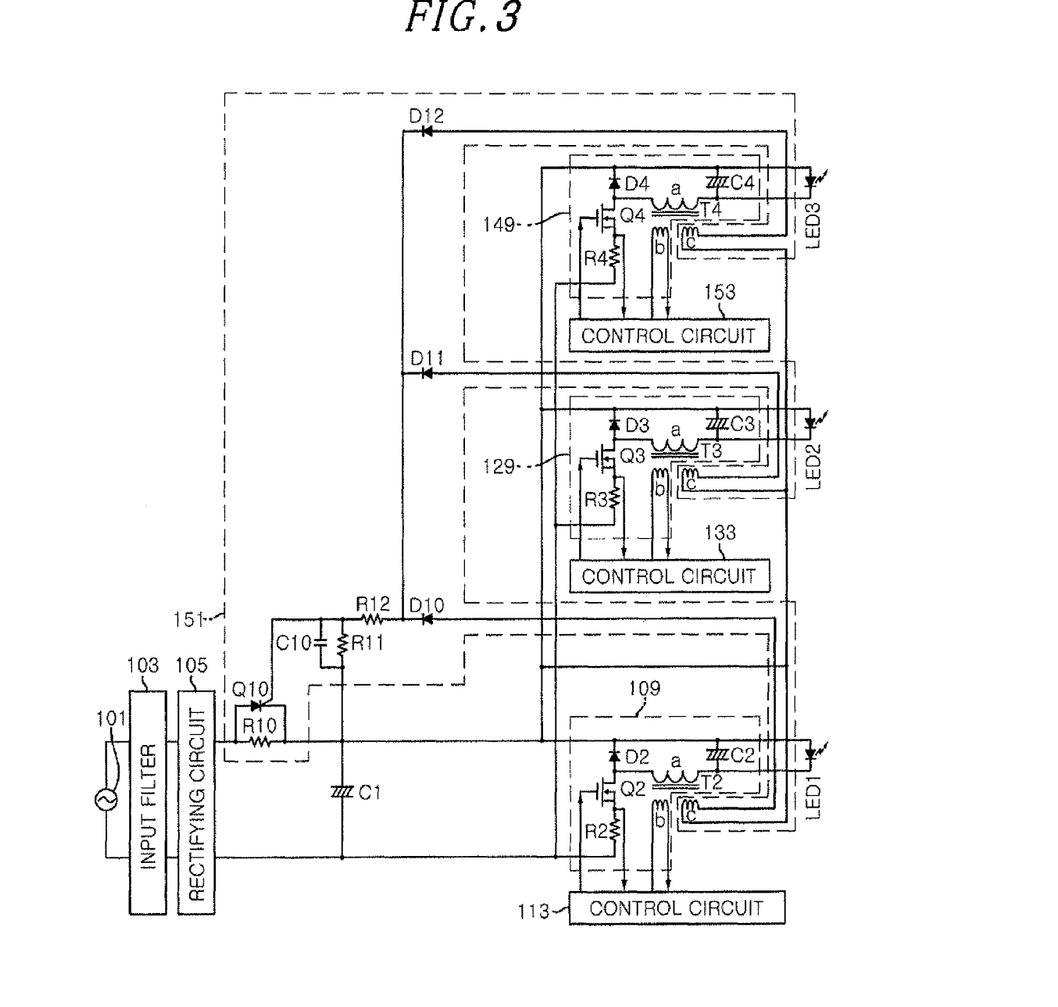
FIG. 3 illustrates a second example of another circuit configuration in connection with the first embodiment.

FIG. 3 illustrates a second example of another configuration of the illumination device in accordance with the first embodiment of the present invention. The circuit configuration of the second example shown in FIG. 3 is different from the circuit configuration shown in FIG. 1 in that the step-up chopper circuit 107 is omitted, lighting circuits of the LED2 and an LED3 are added and a configuration of the inrush current limiting circuit is changed according to the addition of the lighting circuits of the LED2 and the LED3.

In the circuit configuration shown in FIG. 3, the like reference numerals will be given to like parts as those in the circuit configuration of the illumination device shown in FIG. 1, and redundant description thereof will be omitted.

In the configuration shown in FIG. 3, the step-down chopper circuit 129 and the control circuit 133 are provided to form the lighting circuit of the LED2.

(Step-Down Chopper Circuit 129)

The step-down chopper circuit 129 includes the MOS-FET Q3, the primary winding a of the transformer T3, the first secondary winding (input side) b of the transformer T3, the diode D3, the resistor R3, and the capacitor C3.

Next, the operation of the step-down chopper circuit 129 will be described. A detection signal for turning on the MOS-FET Q3 is generated by a signal of the first secondary winding b of the transformer T3.

Further, a current flowing during the ON period of the MOS-FET Q3 is detected by the resistor R3, thereby generating a detection signal for turning off the MOS-FET Q3.

The control circuit 133 compares each detection signal with a reference voltage to determine a timing of turning on and off the MOS-FET Q3.

The control circuit 133 generates a signal for turning on and off the MOS-FET Q3 based on the determined on/off timing, and controls a current flowing through the LED2 to become a specific current.

In the configuration shown in FIG. 3, a step-down chopper circuit 149 and a control circuit 153 are provided to form the lighting circuit of the LED3.

(Step-Down Chopper Circuit 149)

The step-down chopper circuit 149 includes a MOS-FET Q4, a primary winding a of a transformer T4, of a first secondary winding (input side) b of the transformer T4, a diode D4, a resistor R4, and a capacitor C4.

Next, the operation of the step-down chopper circuit 149 will be described. A detection signal for turning on the MOS-FET Q4 is generated by a signal of the first secondary winding b of the transformer T4.

Further, a current flowing during the ON period of the MOS-FET Q4 is detected by the resistor R4, thereby generating a detection signal for turning off the MOS-FET Q4.

The control circuit 153 compares each detection signal with a reference voltage to determine a timing of turning on and off the MOS-FET Q4.

The control circuit 153 generates a signal for turning on and off the MOS-FET Q4 based on the determined on/off timing, and controls a current flowing through the LED3 to become a specific current.

(Configuration of Inrush Current Limiting Circuit 151)

An inrush current limiting circuit 151 is configured as follows. Further, also in this configuration, the resistor R10 serving as the inrush current limiter is provided to reduce an inrush current. Instead of the resistor R10, a thermistor may be used as the inrush current limiter.

The inrush current limiting circuit 151 shown in FIG. 3 includes the resistor R10, the switching element Q10, the capacitor C10, the resistors R11 and R12, the diodes D10, D11 and D12, and the second secondary winding (output side) c of each of the transformers T1, T2, T3 and T4.

After one of the step-down chopper circuit 109, the step-down chopper circuit 129 and the step-down chopper circuit 149 is started, the inrush current limiting circuit 151 is set in a non-operation state. That is, an input current flowing from the power source 101 passes through the switching element Q10 without passing through the inrush current limiter R10 when any one of the step-down chopper circuit 109, the step-down chopper circuit 129 and the step-down chopper circuit 149 is started first, thereby becoming an almost short-circuited (conducting) state.

In FIG. 3, a start-up voltage for turning on the thyristor serving as the switching element Q10 is obtained from the second secondary winding c of the transformer T2 in the step-down chopper circuit 109, the second secondary winding c of the transformer T3 in the step-down chopper circuit 129, and the second secondary winding c of the transformer T4 in the step-down chopper circuit 149.

The second secondary winding (output side) c of the transformer in each of the step-down chopper circuit 109, the step-down chopper circuit 129 and step-down chopper circuit 149 functions as a trigger circuit. Further, a trigger signal for the operation and non-operation of the inrush current limiting circuit 151 is generated from the trigger circuit.

In the configuration shown in FIG. 3, an OR circuit is configured by diodes D10, D11 and D12 and resistors R11 and R12 such that any one of switching circuit of the step-down chopper circuit 109, the step-down chopper circuit 129 and step-down chopper circuit 149 may be started first to turn on the switching element Q10.

The output voltage of the OR circuit is smoothed by the capacitor C10 to become a start-up voltage for turning on the switching element Q10 (thyristor).

Accordingly, in the illumination device having the configuration shown in FIG. 3 as well, after the power source is turned on, the inrush current can be reduced by the resistor R10 serving as the inrush current limiter. Further, in the illumination device of this example, no matter which one of the step-down chopper circuit 109, the step-down chopper circuit 129 and the step-down chopper circuit 149 is started first after the inrush current is reduced, it is possible to ensure the start-up voltage of the thyristor serving as the switching element Q10.

Therefore, in the illumination device having the configuration shown in FIG. 3, after the power source is turned on, the switching element Q10 is turned on immediately, so that each switching circuit (step-down chopper circuit 109, step-down chopper circuit 129, step-down chopper circuit 149) can surely perform a desired operation.

(Third Example of Another Configuration)

Figure 4:
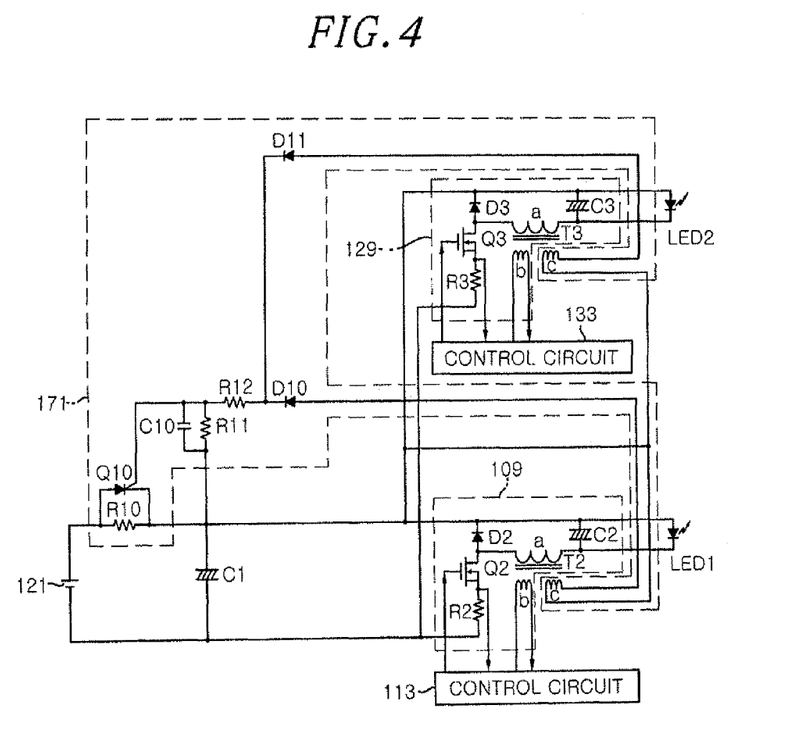
FIG. 4 illustrates a third example of another circuit configuration in connection with the first embodiment.

FIG. 4 illustrates a third example of another configuration of the illumination device in accordance with the first embodiment of the present invention. The circuit configuration of the third example shown in FIG. 4 is different from the circuit configuration shown in FIG. 1 in that the input filter, the rectifying circuit and the step-up chopper circuit are omitted by providing a DC power source 121 instead of the power source 101, a lighting circuit of the LED2 is added and a configuration of the inrush current limiting circuit is changed according to the addition of the LED2.

In the circuit configuration shown in FIG. 4, the like reference numerals will be given to the like parts as those in the circuit configuration of the illumination device shown in FIG. 1, and redundant description thereof will be omitted.

In the configuration shown in FIG. 4, the step-down chopper circuit 129 and the control circuit 133 are provided to form the lighting circuit of the LED2.

(Step-Down Chopper Circuit 129)

The step-down chopper circuit 129 includes the MOS-FET Q3, the primary winding a of the transformer T3, the first secondary winding (input side) b of the transformer T3, the diode D3, the resistor R3, and the capacitor C3.

Next, the operation of the step-down chopper circuit 129 will be described. A detection signal for turning on the MOS-FET Q3 is generated by a signal of the first secondary winding b of the transformer T3.

Further, a current flowing during the ON period of the MOS-FET Q3 is detected by the resistor R3, thereby generating a detection signal for turning off the MOS-FET Q3.

The control circuit 133 compares each detection signal with a reference voltage to determine a timing of turning on and off the MOS-FET Q3.

The control circuit 133 generates a signal for turning on and off the MOS-FET Q3 based on the determined on/off timing, and controls to a current flowing through the LED2 to become a specific current.

(Configuration of Inrush Current Limiting Circuit 171)

An inrush current limiting circuit 171 is configured as follows. Further, also in this configuration, the resistor R10 serving as the inrush current limiter is provided to reduce an inrush current. Instead of the resistor R10, a thermistor may be used as the inrush current limiter.

The inrush current limiting circuit 171 shown in FIG. 4 includes the resistor R10, the switching element Q10, the capacitor C10, the resistors R11 and R12, the diodes D10 and D11, and the second secondary winding (output side) c of each of the transformers T2 and T3.

After one of the step-down chopper circuit 109 and the step-down chopper circuit 129 is started, the inrush current limiting circuit 171 is set in a non-operation state. That is, an input current flowing from the DC power source 121 passes through the switching element Q10 without passing through the inrush current limiter R10 serving as the inrush current limiter when any one of the step-down chopper circuit 109 and the step-down chopper circuit 129 is started first, thereby becoming an almost shorted (conducting) state.

In FIG. 4, a start-up voltage for turning on the thyristor serving as the switching element Q10 is obtained the second secondary winding c of the transformer T2 in the step-down chopper circuit 109, and the second secondary winding c of the transformer T3 in the step-down chopper circuit 129.

In other words, the second secondary winding c of the transformer in each of the step-down chopper circuit 109 and the step-down chopper circuit 129 functions as a trigger circuit. Further, a trigger signal for the operation and non-operation of the inrush current limiting circuit 171 is generated from the trigger circuit.

In the configuration shown in FIG. 4, an OR circuit is configured by diodes D10 and D11 and resistors R11 and R12 such that any one of switching circuit of the step-down chopper circuit 109 and the step-down chopper circuit 129 may be started first to turn on the switching element Q10.

The output voltage of the OR circuit is smoothed by the capacitor C10 to become a start-up voltage for turning on the switching element Q10 (thyristor).

Accordingly, in the illumination device having the configuration shown in FIG. 4 as well, after the power source is turned on, the inrush current can be reduced by the resistor R10 serving as the inrush current limiter. Further, in the illumination device of this example, no matter which one of the step-down chopper circuit 109 and the step-down chopper circuit 129 is started first after the inrush current is reduced, it is possible to ensure the start-up voltage of the thyristor serving as the switching element Q10.

Therefore, in the illumination device having the configuration shown in FIG. 4, after the power source is turned on, the switching element Q10 is turned on immediately, and each switching circuit (step-down chopper circuit 109, step-down chopper circuit 129) can surely perform a desired operation.

Further, in the illumination device in accordance with the first embodiment of the present invention, since each of the circuit configuration of the first to third examples has a plurality of LEDs, it may be applied to an illumination system including each LED lighting circuit as an independent illumination device.

(Second Embodiment)

Figure 5:
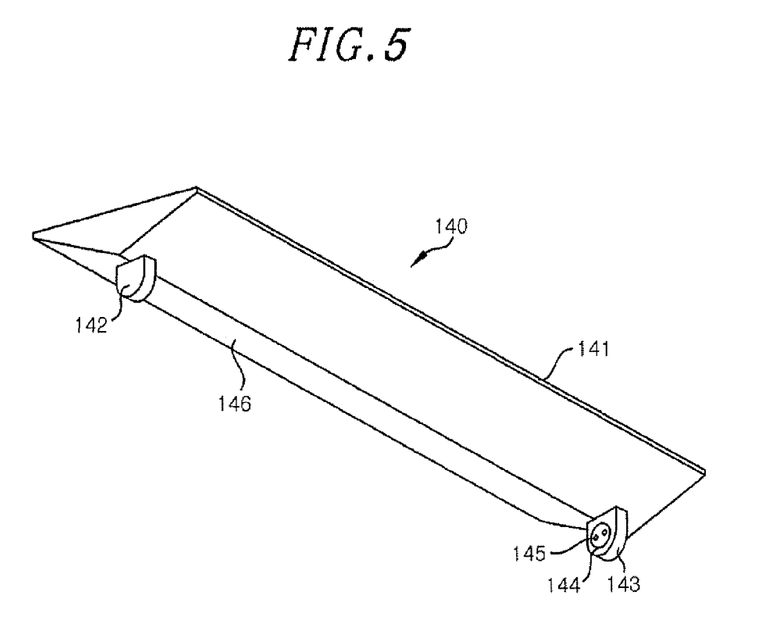
FIG. 5 illustrates a configuration of an illumination apparatus in accordance with a second embodiment of the present invention.

The LED lighting device of the first embodiment may be used in, e.g., a straight pipe type LED illumination apparatus 140 shown in FIG. 5. FIG. 5 illustrates the straight pipe type LED illumination apparatus 140 in accordance with the second embodiment of the present invention. The straight pipe type LED illumination apparatus 140 shown in FIG. 5 is an illumination apparatus having one lamp.

As illustrated in FIG. 5, the LED illumination apparatus 140 in accordance with the second embodiment of the present invention includes an apparatus main body 141, a pair of sockets 142 and 143 having lamp pin contact holes 145 through which the straight pipe type LED is attached to both ends of the apparatus main body 141 and a spring 144, and a reflection plate 146.

When the LED lighting device in accordance with the embodiment of the present invention is applied to the illumination apparatus 140 shown in FIG. 5, the same effect as that of the above embodiment can be obtained.

Further, the LED lighting device in accordance with the embodiment of the present invention may be applied to an apparatus having two or more lamps.

Further, various shapes of LEDs may be used in addition to straight pipe type LEDs used in a shop or a facility.

The LED lighting device and the illumination apparatus including the LED lighting device in accordance with the embodiments of the present invention have an effect of surely performing a desired operation by setting an inrush current limiting circuit in a non-operation state in response to a switching circuit which starts operation first, and are useful for an illumination system and the like.

While the invention has been shown and described with respect to the embodiments, it will be understood by those skilled in the art that various changes and modification may be made without departing from the scope of the invention as defined in the following claims.

What is claimed is:

1. An LED lighting device comprising:
   two or more switching circuits connected between a power source and an LED (light emitting diode) unit;
   an inrush current limiting circuit which limits an inrush current flowing through the LED lighting device when power is turned on; and
   a trigger circuit which generates a trigger signal of an operation/non-operation of the inrush current limiting circuit from the switching circuits,
   wherein the inrush current limiting circuit is set in a non-operation state when any one of the switching circuits is started first.

2. The LED lighting device of claim 1, wherein the trigger circuit uses a voltage of a secondary winding of coils of each of the switching circuits.

3. An illumination apparatus comprising: the LED lighting device of claim 2.

4. An illumination apparatus comprising: the LED lighting device of claim 1.

* * * * *